US009612330B2

(12) United States Patent
Parodi-Keravec et al.

(10) Patent No.: US 9,612,330 B2
(45) Date of Patent: Apr. 4, 2017

(54) PROXIMITY SENSOR INCLUDING A PHOTON EMITTER, A PHOTON RECEIVER AND AN OPAQUE STRUCTURE

(71) Applicants: STMicroelectronics (Research & Development) Limited, Buckinghamshire (GB); STMicroelectronics (Grenoble 2) SAS, Grenoble (FR)

(72) Inventors: Pierre-Jean Parodi-Keravec, Edinburgh (GB); Marc Drader, Lans en Vercors (FR)

(73) Assignees: STMicroelectronics (Grenoble 2) SAS, Grenoble (FR); STMicroelectronics (Research & Development) Limited, Buckinghamshire (GB)

( * ) Notice: Subject to any disclaimer, the term of this patent is extended or adjusted under 35 U.S.C. 154(b) by 78 days.

(21) Appl. No.: 14/181,019

(22) Filed: Feb. 14, 2014

(65) Prior Publication Data

US 2014/0231633 A1 Aug. 21, 2014

(30) Foreign Application Priority Data

Feb. 20, 2013 (FR) ..................... 13 51456

(51) Int. Cl.
*G01S 17/06* (2006.01)
*G01V 8/12* (2006.01)
*G01V 8/14* (2006.01)

(52) U.S. Cl.
CPC ................ *G01S 17/06* (2013.01); *G01V 8/12* (2013.01); *G01V 8/14* (2013.01)

(58) Field of Classification Search
CPC ....... H01L 27/00; H01L 27/14; H01L 27/144; H01L 31/00; H01L 31/08; H01L 31/14; H01L 31/0232; H01L 33/00; H04B 10/00; H04B 1/587
USPC ... 250/205, 214 R, 216, 221, 239, 551, 552, 250/208.1, 203.1, 203.2, 203.3, 214 AL; 385/15; 356/3–22, 139.01;
(Continued)

(56) References Cited

U.S. PATENT DOCUMENTS 3,621,268 A * 11/1971 Friedrich et al. .......... 250/214.1
4,906,839 A *  3/1990 Lee ............................... 250/239
(Continued)

FOREIGN PATENT DOCUMENTS

| DE | 102 29 408 A1 | 1/2004 |
| EP | 0 349 694 A1 | 1/1990 |
| EP | 1 780 559 | 5/2007 |

*Primary Examiner* — Que T Le
*Assistant Examiner* — Jennifer Bennett
(74) *Attorney, Agent, or Firm* — Seed Intellectual Property Law Group LLP (57) ABSTRACT

One or more embodiments are directed to a device comprising: a body having a cavity, an opaque structure, and an aperture in the body that places the cavity in fluid communication with an environment external to the body. A photon emitter is located in the cavity below the aperture and configured to emit photons through the aperture to the environment external to the body. A photon receiver is located in the cavity below the opaque structure of the body and configured to receive photons that are each reflected from both an object that is spaced apart from the body in the environment external to the body and from a surface of the opaque structure.

23 Claims, 7 Drawing Sheets

(58) Field of Classification Search
USPC ............ 235/414–416; 348/135–161; 396/89, 396/111, 121, 122, 123, 125
See application file for complete search history.

(56) References Cited

U.S. PATENT DOCUMENTS

| | | | |
|---|---|---|---|
| 6,087,653 | A * | 7/2000 | Van Schyndel ...... H03K 17/941 250/227.11 |
| 6,526,189 | B1 | 2/2003 | Yankielun |
| 7,960,699 | B2 * | 6/2011 | Chang et al. .............. 250/338.4 |
| 8,761,830 | B2 * | 6/2014 | Kido .................... H03K 17/941 250/221 |
| 2006/0161871 | A1 | 7/2006 | Hotelling et al. |
| 2007/0182949 | A1 | 8/2007 | Niclass |
| 2008/0167834 | A1 * | 7/2008 | Herz et al. ................... 702/150 |
| 2009/0027652 | A1 * | 1/2009 | Chang et al. ............... 356/4.01 |
| 2012/0162636 | A1 | 6/2012 | Sy |
| 2014/0070080 | A1 * | 3/2014 | Ruh ..................... G01S 7/4813 250/216 |

* cited by examiner

PROXIMITY SENSOR INCLUDING A PHOTON EMITTER, A PHOTON RECEIVER AND AN OPAQUE STRUCTURE

BACKGROUND

Technical Field

The present disclosure relates to an object detection device such as a proximity sensor.

Description of the Related Art

Position sensors are generally based on the analysis of sound, radio, or light waves. In the case of light waves, emitters and receivers are placed in front of an aperture in the package of a device.

Such devices are for example described in documents U.S. Patent Publication No. 2006/0161871 and U.S. Patent Publication No. 2012/0162636.

BRIEF SUMMARY

An embodiment provides a device comprising a photon emitter and a photon receiver. The device is configured to detect objects of variable size, shape, and color, in various ambient light conditions.

Another embodiment relates to a method enabling to use a device provided with an emitter and a receiver.

An embodiment provides a device comprising a photon emitter, a photon receiver, and a screen opaque to photons following a direct path from the outside of the device to the photon receiver.

According to an embodiment, the photon emitter and the photon receiver are supported by a same semiconductor substrate.

According to an embodiment, the photon receiver receives photons propagating inside of the device through a cavity located between the photon emitter and the photon receiver.

According to an embodiment, the device further comprises a display screen.

According to an embodiment, the device is of mobile terminal type.

According to an embodiment, the device is of cell phone type.

According to an embodiment, the device further comprises an additional photon receiver of ambient light sensor type.

According to an embodiment, the device comprises at least one measurement performed by the additional photon receiver, said measurement being used to adjust the operating mode of the photon receiver.

Another embodiment provides a method using a device such as hereabove, comprising a step of photon emission by the photon emitter for at least a first time range, a step of measuring the quantity of photons received by the photon receiver, and a step of storing the value of this measurement.

According to an embodiment, a step of measurement by the photon receiver of the quantity of photons received during at least a second time range with no emission by the photon emitter, a step of calculation of the difference between the measurements respectively performed during the first and the second time range, and a step of storage of the value of this difference are further provided.

According to an embodiment, a step of determining whether an object external to the device is present or not is provided.

According to an embodiment, the duration of at least one of the three time ranges of emission by the photon emitter, of reception by the photon receiver during a portion of the time range of emission by the photon emitter, and of reception by the photon receiver during a time range with no emission by the photon emitter, is adapted according to the quantity of photons previously received by the photon receiver during at least a portion of a time range of emission by the photon emitter.

According to an embodiment, a step of comparison of the stored measured value or of the value of the stored difference with a threshold and a step of taking into account the fact that an object external to the device is present if said stored value is greater than said threshold, are provided.

According to an embodiment, a step of cyclic photon emission by the photon emitter and a step of taking into account the fact that an object external to the device is present on the additional condition that the stored measured value or the value of the stored difference increases, in average, a long time, are provided.

According to an embodiment, a step of comparison of the measured value with a threshold and a step of taking into account the fact that an object external to the device is present on the additional condition that said stored value is at least once greater than said threshold, are provided.

The foregoing and other features and advantages will be discussed in detail in the following non-limiting description of specific embodiments in connection with the accompanying drawings.

DETAILED DESCRIPTION

The same elements have been designated with the same reference numerals in the different drawings, which have been drawn out of scale. For clarity, only those steps and elements which are useful to the understanding of the described embodiments have been detailed. In particular, the nature of the transmitted information has not been detailed, the described embodiments being compatible with whatever information currently transmitted by such devices. Further, it is be appreciated that the structure for the transmit and receive circuits has not been detailed, said structure being here again compatible with known circuits and thus well known in the art.

The embodiments described hereafter refer to the case of proximity sensors involving light waves located in the visible range and in the near infrared range. They however apply to the use of radiation waves in general.

Figure 1A:
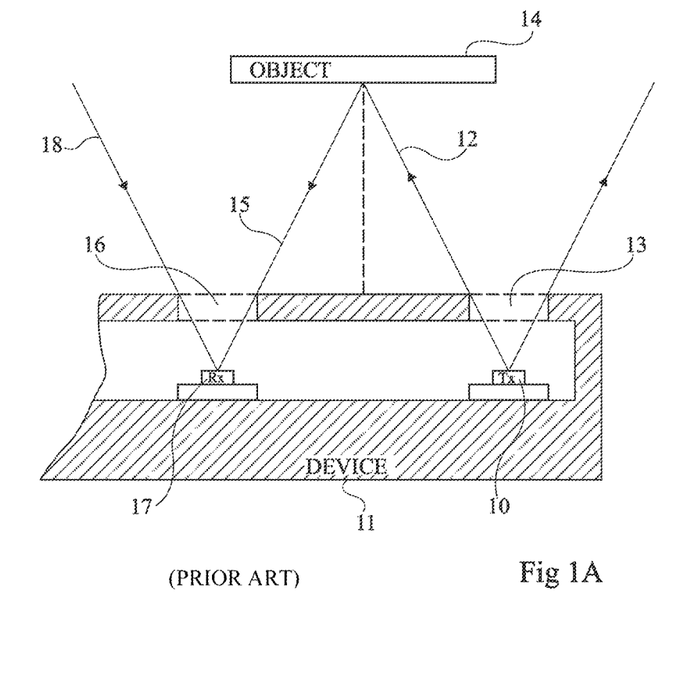
FIGS. 1A and 1B illustrate the operation of a known proximity sensor.
Figure 1B:
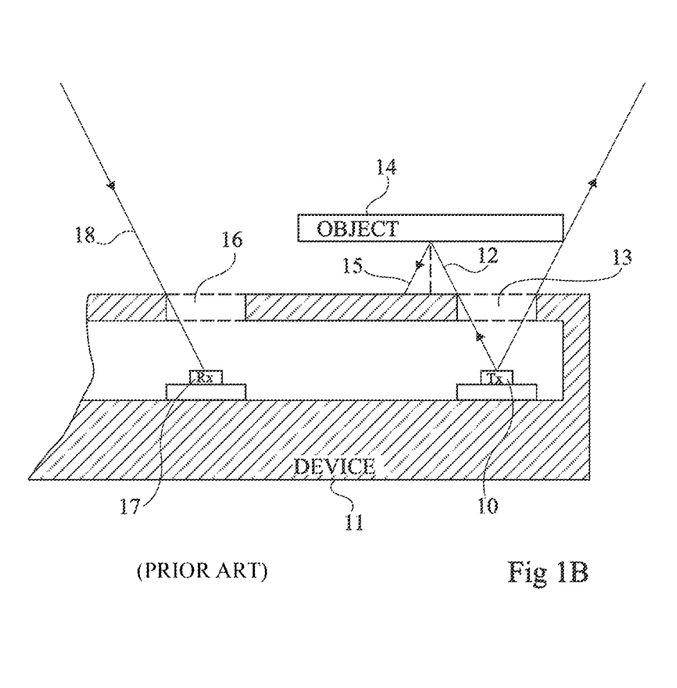

FIGS. 1A and 1B are simplified views of a device (DEVICE) 11 equipped with a known proximity sensor.

A photon emitter (TX) 10, located inside of device 11, emits a photon beam 12 through an aperture 13. This beam partly reflects on an object (OBJECT) 14 and part of the reflected photons 15 returns towards device 11.

FIG. 1A shows the case of a relatively distant object 14. In this case, part of reflected photons 15 penetrates through an aperture 16 different from aperture 13 and reaches the sensitive surface of a photon receiver (RX) 17. Receiver 17 also receives a photon beam 18 originating from the ambient light.

FIG. 1B shows the case of an object 14 relatively close to device 11. The emitter operates in the same way as previously. In this case, part of the reflected photons 15 returns to device 11. However, due to the proximity of the object, the reflection cannot reach aperture 16 and activate receiver 17. Receiver 17 only receives beam 18 originating from the ambient light.

It could be envisaged to make apertures 13 and 16 closer to each other to improve the operation. However, a phenomenon, called crosstalk, which involves a transmission of a flow of parasitic photons from emitter 10 to receiver 17 without the photons being propagated outside of device 11, often forces a design constraint of a distance between emitter 10 and receiver 17, and accordingly between apertures 13 and 16.

An application of a proximity detector, for example, is the detection of a presence of an object 14 before it comes into contact with an element of a piece of equipment provided with the proximity detector and causes a malfunction. An example of such a malfunction corresponds to the unwanted execution of a function on a touchscreen having an object 14 coming into contact therewith. For example, it may be desired to avoid detecting contact of the upper portion of a mobile phone with a user's ear or hair while, however, a voluntary action of this user's hand on another part of this cell phone should be detected. The detection of very close and very thin objects 14 such as dark hair is particularly difficult. Frequently, the phone, though equipped with device 11, cannot detect it before it comes into contact with the screen.

The features of objects 14 to be detected have significant variability. The proportion of waves transmitted by emitter 10 and reflected by object 14 depends on the size of this object, on its surface state, on its capacity to absorb a variable proportion of waves that it receives from emitter 10. The surface state of object 14 may result in that part of the radiation reflects in all directions (diffuse or Lambertian reflection) or not according to an angle identical to that formed by the ray incident on the object with the direction perpendicular to the surface element of the object located at the contact point of the ray (specular reflection). A consequence thereof is that according to the type of object 14, a significant portion of the reflected wave does not illuminate receiver 17. Conversely, in the case of a highly-reflective object, the specular reflection cannot reach the receiver while the diffuse reflection reaches it.

Since objects 14 in immediate proximity to device 11 may further be in relative movement towards it, a short response time is generally preferred to detect the objects. A light wave travels approximately 45 cm in 3 ns and the objects to be detected may be distant by a few millimeters only from the package of device 11. In the current state of technology, the method for assessing the distance by direct measurement of the time of flight of the emitted wave, by means of the analysis of the phase shift between the emitted wave and the received wave, raises difficulties of implementation for short distances.

Another problem results from the fact that receiver 17 further receives a beam of waves originating from ambient light 18. This beam has an intensity which may be greater than that of photon beam 15 reflected by object 14. The accuracy of the measurement is thereby significantly decreased.

It could have been devised to filter the ambient light. However, most proximity sensors operate by using the near-infrared spectrum, the wavelength often being within the range from 850 nm to 950 nm.

Proximity sensors using a portion of the spectrum located in the visible and infrared range generally use light-emitting diode or laser diode emitters 10. The laser diode focuses the light in a narrower cone than the light-emitting diode: 86% of the photons are emitted in a 30° solid angle. Laser diode emitter 10 also has a better performance in pulsed mode, comprising sending wave trains formed of a succession of short emission periods followed by short idle periods.

Proximity sensors often use receivers 17 of fast charge transfer photodiode type or of avalanche diode type. In this last case, the diodes are so-called Geiger-mode diodes (Single Photon Avalanche Diode—SPAD—), having an operating principle which may be likened to that of a semiconductor element with a very short response time, capable of counting each photon which reaches its surface. A known advantage of avalanche diodes is that they can be used during cycles having reactivation periods shorter than 10 ns, which enables to detect very close objects. The reactivation cycle is a parameter determining the frequency at which the diode can detect a new photon. The avalanche diode is well adapted in the case of pulsed-mode operation.

Other effects, such as disturbances due to the device heating, technological dispersions according to the batches of receiver components, make it difficult to initially calibrate devices.

Only objects 14 close to the device should be detected, for example, those located within a range from a few mm to some ten cm. A non-limiting example corresponds to the case where the presence of an object close to a specific portion of a piece of equipment provided with device 11 should be detected, without detecting the presence of objects located on another portion of the piece of equipment.

Figure 2A:
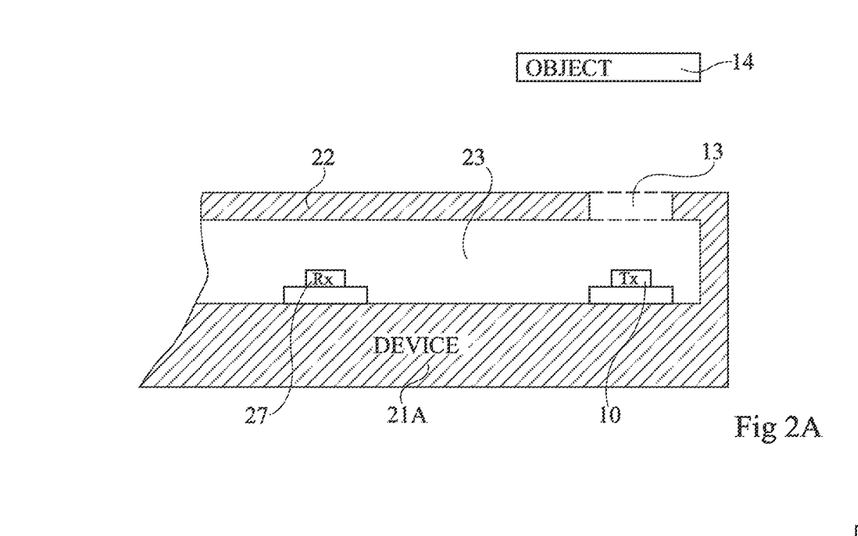
FIGS. 2A, 2B, and 2C show three embodiments of a proximity sensor.
Figure 2B:
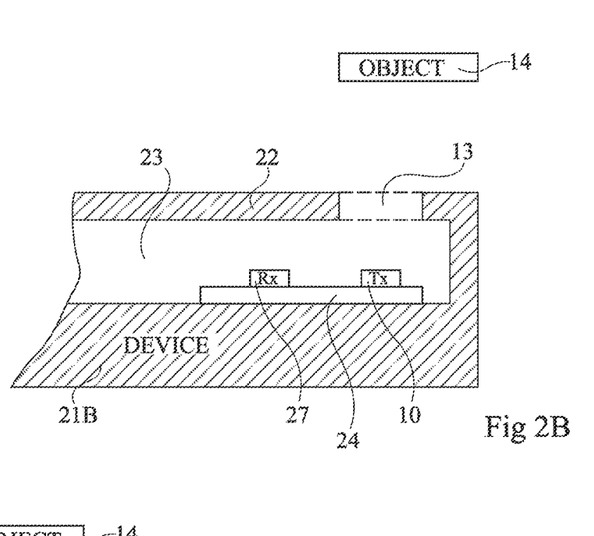
Figure 2C:
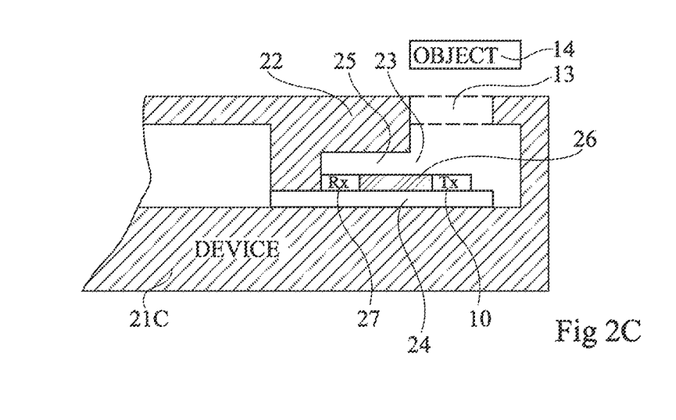

FIGS. 2A, 2B, and 2C describe proximity sensors 21A, 21B, and 21C according to different embodiments where, as compared with receiver 17 of FIGS. 1A and 1B, receiver 27 is topped with a screen 22 opaque to photons which reach it in a direct travel from the outside.

The fact for receiver 27 to be isolated by an opaque screen 22 on top of it enables the receive 27 to strongly attenuate the intensity of the ambient light 18 that it senses and to promote the reception of beam 15 reflected by an object 14 when the latter is close. Receiver 27 receives the photons which propagate in its direction in a cavity 23 separating it from emitter 10 and defined by the housing receiving emitter 10 and receiver 27 and by screen 22.

In FIG. 2A, emitter 10 and receiver 27 respectively belong to two different components, and are distant from each other by a distance capable of approximately reaching some ten cm.

In FIG. 2B, emitter 10 and receiver 27 are supported by a same semiconductor substrate 24, and are close to each other, the distance separating them being on the order of one mm.

In FIG. 2C, part of cavity 23 is arranged in the form of a duct 25, located between the periphery of emitter 10 and that of receiver 27, enabling to guide a portion of the photon flow present in the cavity towards receiver 27. Preferably, the interval between emitter 10 and receiver 27 is filled flush with their respective upper surfaces (such as with a reflective block 26), to avoid parasitic travels of the photons.

Figure 3:
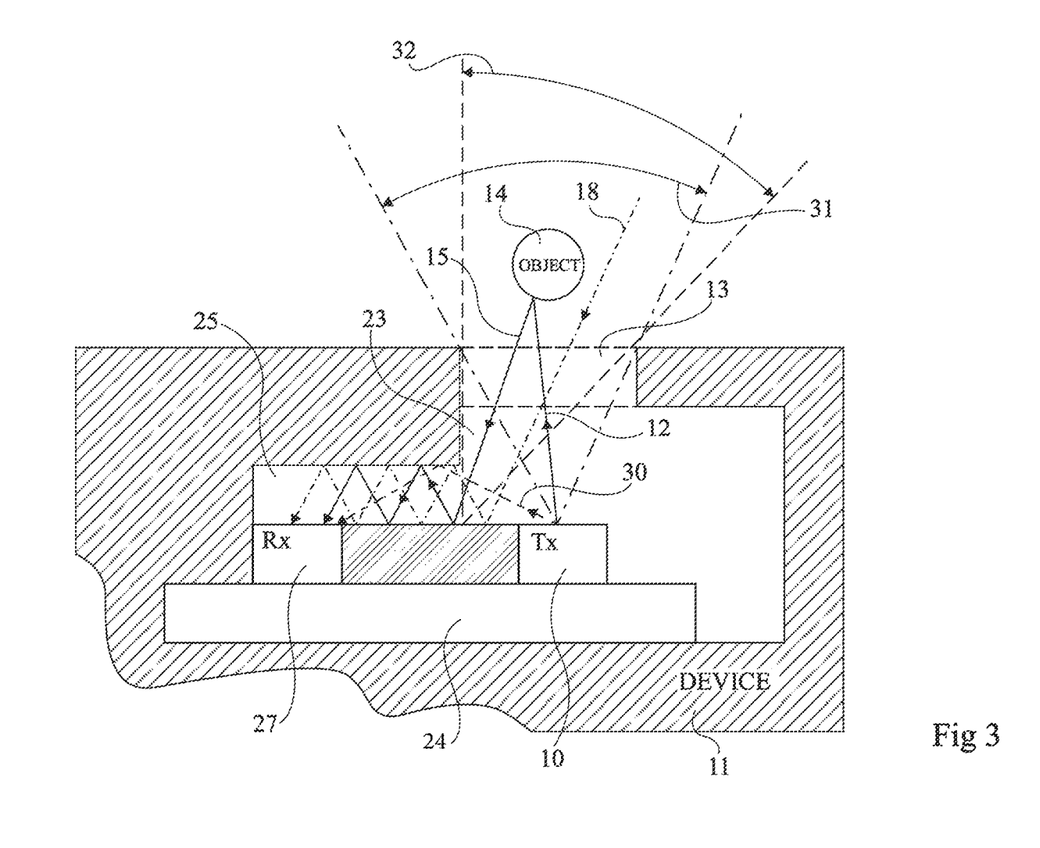
FIG. 3 illustrates the operation of the proximity sensor of FIG. 2C.

FIG. 3 illustrates the travel of different types of photon beams in the vicinity and inside of device 21C of FIG. 2C.

A first beam 12 corresponds to the emission of a beam by emitter 10 towards external object 14. Reflected beam 15 penetrates through aperture 13 and propagates through duct 25 towards receiver 27.

A second beam 18 originates from the ambient light and reaches receiver 27 in the same way as reflected beam 15.

A third beam 30 originates from emitter 10 and directly propagates through duct 25 without having crossed aperture 13. This parasitic beam creates crosstalk between emitter 10 and receiver 27.

Emission and reception solid angles 31 and 32, defining the emission and reception windows, depend on aperture 13 located in the package and on the structure of the components receiving emitter 10 and receiver 27. Aperture 13 of the package is often formed by means of an area where the opaque paint deposited on the package glass has been removed.

Duct 25 substantially acts as a waveguide. It may for example be formed by means of a plastic element, by means of an optical fiber segment, or by a simple recess.

Figure 4:
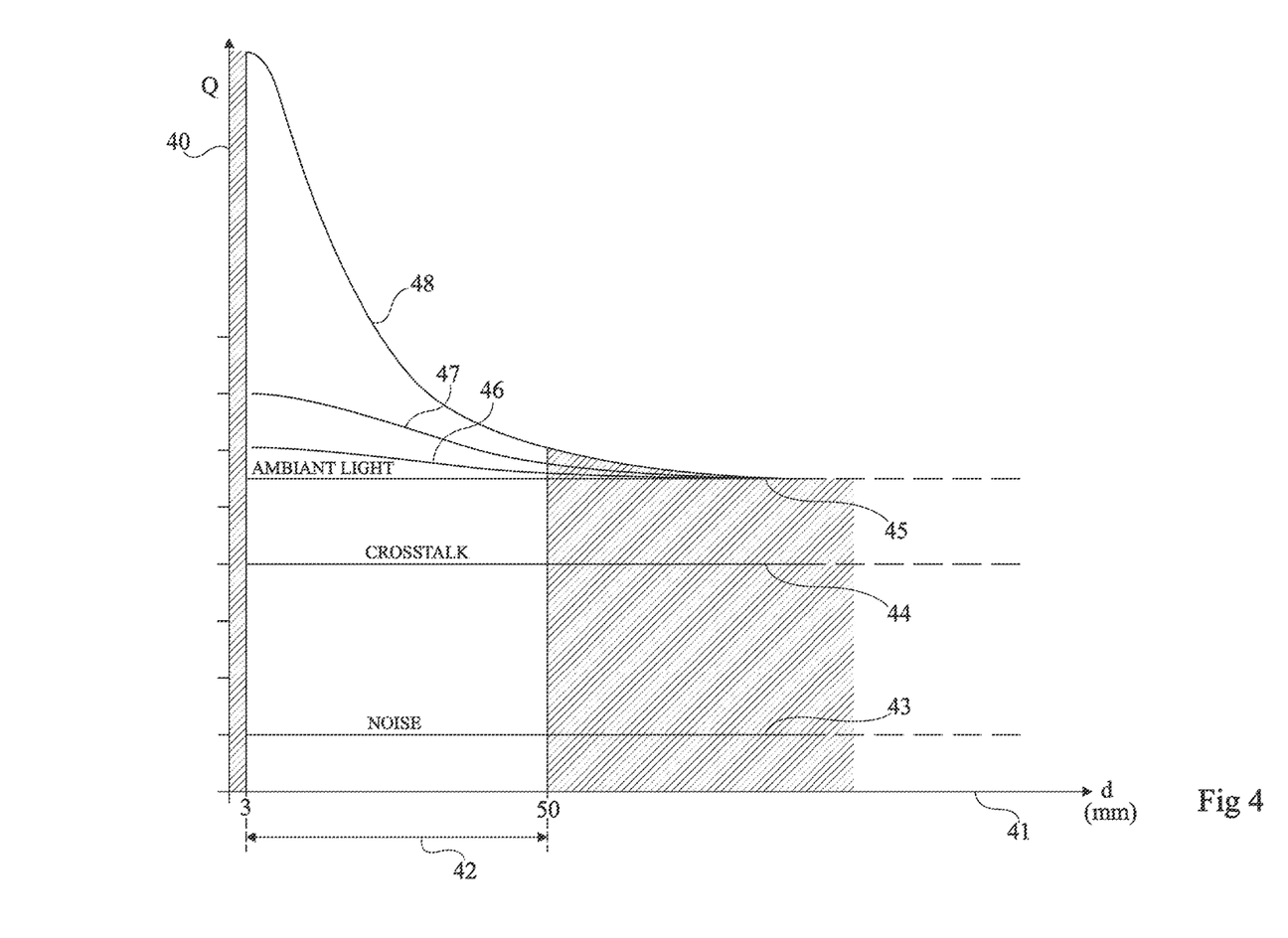
FIG. 4 illustrates the operation of a proximity sensor such as shown in FIG. 2A, 2B, or 2C.

FIG. 4 is a diagram illustrating the variation of the quantity of photons Q 40 received by receiver 27, according to distance d 41 between device 21 of FIG. 2C and object 14. The scale of distances 42 varies, in this example, from 3 mm to 50 mm. The quantity of photons utilized for an accurate measurement depends on the type of receiver 27. For example, a Geiger diode receiver 27 may count on the order of $10^9$ photons per second per $mm^2$ of sensitive surface area, and a measurement time on the order of one millisecond enables to detect object 14 with a correct accuracy.

FIG. 4 shows three examples of response curves 46, 47, and 48 of receiver 27 according to the type of object which is present. Curve 46 illustrates the case of a highly-dispersive dark object 14. Curve 47 illustrates the case of a highly-dispersive light object 14. Curve 48 illustrates the case of a non-dispersive object 14 having a high reflection factor. Each of these curves results of an addition of photons originating from different sources and origins.

A first quantity (NOISE) 43, called residual photon noise, results from the electronic noise inherent to any active component of photon sensor type, such a noise being considered as a quantity of photons by the processing means associated with receiver 27.

A second quantity (CROSSTALK) 44 results from the crosstalk between emitter 10 and receiver 27.

A third quantity (AMBIENT LIGHT) 45 originates from the ambient light.

Each of curves 46, 47, and 48 results from the addition of these three quantities and of the photons originating from the portion of beam 15 which reflects on each of the corresponding objects 14, and which penetrates into aperture 13 to be collected by receiver 27 through duct 25.

The amplitude of curves 46, 47, and 48 varies according to the type of object 14 to be detected and to the relative position thereof with respect to device 21. The amplitude decreases approximately according to a law proportional to the inverse of the square of distance d 41. Preferably, duct 25 is sized so that the amplitude of curve 48, which corresponds to the maximum number of photons reflected by time unit, is greater by at least one order of magnitude than the highest of the curves of noise 43, crosstalk 44, and ambient light 45, in the case of a large object located in front of aperture 13. The ratio of the amplitude of curve 48 to that of curve 46, the latter corresponding to the objects most difficult to detect, typically varies from ten to several tens.

Preferably, the reception of reflected beam 15 is favored, while decreasing the relative proportion of photons originating from residual photon noise 43, crosstalk 44, and ambient light 45, and an operation within a range of distances 42 from a few mm to a few cm is favored, from 3 mm to 50 mm in the example of FIG. 4.

The measured quantity of photons due to crosstalk 44 and to residual noise 43 may for example be determined by a calibration of device 21. In the embodiments of the device of the present description, the measured fraction due to ambient light 45 is minimized with respect to the quantity of photons reflected by a close object 14, due to the structure and to the geometry of the assembly formed of emitter 10, of duct 25, and of receiver 27. For example, duct 25 may be formed by means of a material filtering visible light but transparent to the near-infrared component.

Figure 5:
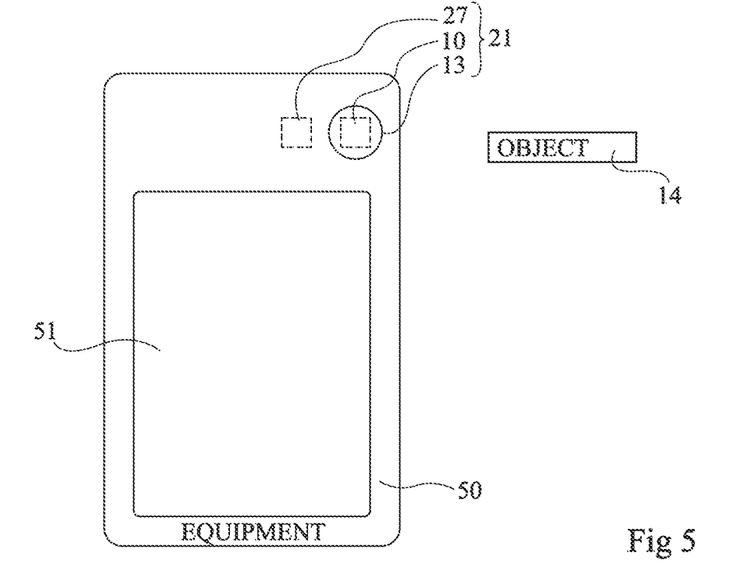
FIG. 5 shows an example of a device integrating a proximity sensor in front view and provided with a touch screen.

FIG. 5 shows an example of a piece of equipment 50 (EQUIPMENT), provided with a device 21 according to any of FIG. 2A, 2B or 2C, and with a display screen 51, which may or not be a touch screen. In the case of a touch screen, device 21 is used to carry out a function of control of screen 51.

For example, piece of equipment 50 is of mobile terminal type. It may in particular be, without this being a limitation, a terminal of digital tablet type, of game console type, of laptop computer type, or of cell phone type.

Many usual devices provided with a screen, in particular with a touch screen, are further provided with a photon receiver called ambient light sensor. The sensitive surface area of the sensor has an aperture on top of it, often in the form of a window letting through light, formed in the device cover. Light rays, directly originating from the outside of the device, are sensed by the receiver. Some of these usual devices have a screen deactivation function exploiting the information provided by this receiver, which has disadvantages, as previously described.

Figure 6:
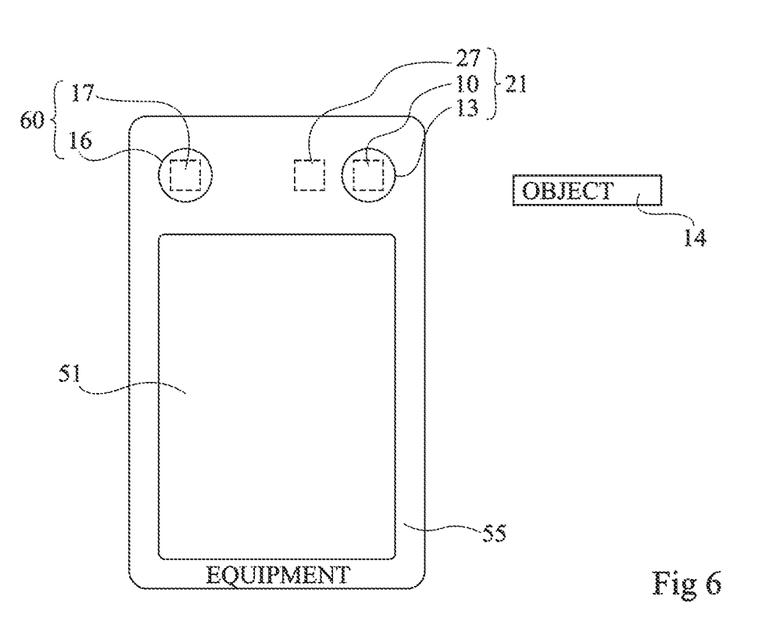
FIG. 6 illustrates a variation of the device of FIG. 5.

FIG. 6 shows a piece of equipment 55 having, as a difference with respect to piece of equipment 50 of FIG. 5, the fact of further integrating an ambient light sensor 60. This sensor is formed of a receiver 17 having an aperture 16 on top of it. Ambient light sensor 60 has as a main function to set the brightness of screen 51 of piece of equipment 55 according to the intensity of the ambient light. In an embodiment, the information provided by sensor 60 is used, for example, to adjust the sensitivity of receiver 27 according to the average intensity of the ambient light.

Figure 7A:
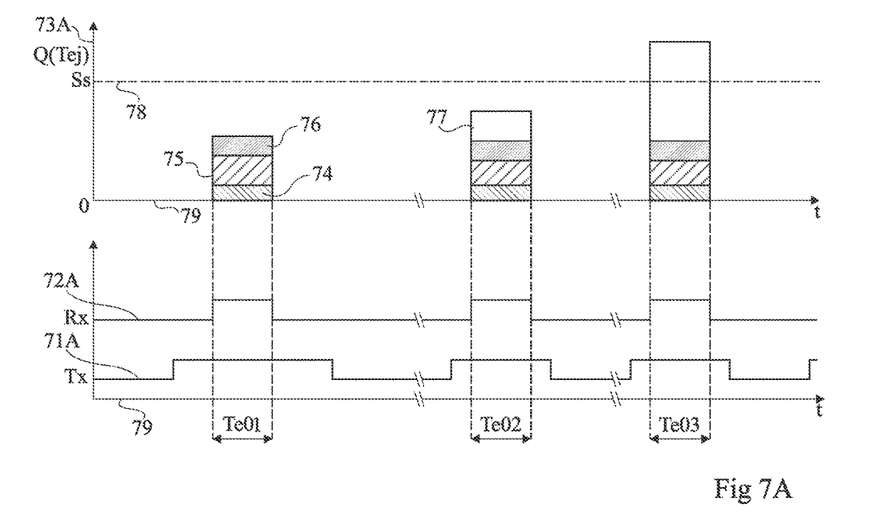
FIGS. 7A and 7B show timing diagrams illustrating the reception of photons by the receiver according to two operating modes.
Figure 7B:
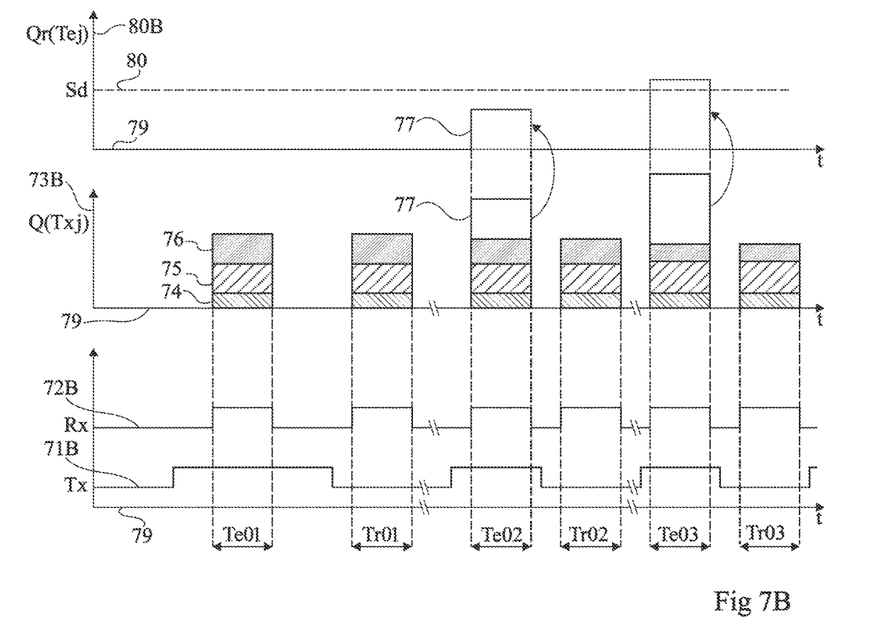

FIGS. 7A and 7B illustrate an object detection method using device 21. The general operating principle is described hereafter, and is followed by a detailed description of the timing diagrams according to specific embodiments.

During a time range or several successive time ranges, shown on time axis t 79, emitter 10 sends a beam of photons 12 to the outside of device 21, this beam being intended to illuminate a possible object 14 close to device 21.

During one or several portions of each time range, receiver 27 measures the quantity of photons reaching it (more generally, it is counted in number of phenomena per second, which may be expressed as the number of electrons created in a semiconductor material, the current, the voltage, a numerical value, etc.). As a variation, this measurement is delayed with respect to the time range(s) to take into account the times of light propagation from emitter 10 to receiver 27. According to another variation, the measurement is performed during and after the time range(s).

Finally, a third step comprises storing the measured information, for subsequent processing purposes for determining whether an object is present or not.

In a first operating mode, receiver 27 measures the quantity of photons received during the entire emission period.

As a variation, the measurement time window is decreased with respect to the emission range. According to the type of emitter 10 and of receiver 27, and more generally to the means for processing the information provided by receiver 27, other embodiments are possible, such as for example a receive mode during a train of periods formed of several intermittent portions during the emission range.

In a second operating mode, the previously-described method comprises at least the three following additional steps.

A first additional step is the measurement, by receiver 27, of the quantity of photons which reaches it during one or several time ranges during which emitter 10 is inactive. The duration of the measurement range(s) during such time periods is advantageously made proportional or equal to the duration of the measurement range(s) during emission time periods.

A second additional step is the calculation of the difference between the measurements respectively performed during an emission time range and emission-less time range couple. Preferably, these two measurements are performed during short consecutive time periods, to be able to consider the ambient light variation as negligible, and similarly to be able to consider that the crosstalk and the residual flow are substantially constant between the two measurements. The result of this second step thus substantially is the quantity of photons measured by receiver 27 originating from the reflection on an object located outside of device 21.

A third additional step is the storage of the result obtained for each measurement for subsequent processing purposes.

FIG. 7A shows a series of timing diagrams illustrating the first embodiment, where several emission periods follow each other. During each period, receiver 27 performs a measurement during a single portion of the emission range. A first timing diagram 71A corresponds to the successive emission ranges. A second timing diagram 72A corresponds to time portions Te01, Te02, Te03 during which receiver 27 measures the quantity of photons received during a fraction of the emission range. The measurement time ranges during the emission are noted Tej, with j=1, 2, 3, . . . . A third timing diagram 73A shows the added quantities Q(Tej) of photons measured during each time portion Te01, Te02, Te03. Each quantity Q(Tej) is the sum of four quantities: Qb(Tej) 74 corresponding to residual noise 43; Qd(Tej) 75 corresponding to crosstalk 44; Qa(Tej) 76 corresponding to ambient light 45; and Qr(Tej) 77 corresponding to the portion of reflected photons, the last three quantities reaching receiver 27 through cavity 23 (and, if provided, duct 25).

The measurement performed by receiver 27 during each emission range is performed continuously. Other embodiments are possible to take into account the features of receiver 27. There may for example be a mode where receiver 27 performs the measurement during several discontinuous portions of each emission range.

The measurement is stored for subsequent processing purposes. Each stored value corresponds to quantity Q(Tej) measured during the portions associated with an emission range.

FIG. 7B is a series of timing diagrams illustrating the operation according to the second embodiment.

A first timing diagram 71B corresponds to the successive emission ranges.

A second timing diagram 72B corresponds to the time portions during which receiver 27 measures the quantity of photons received during a fraction of the emission range, and then measures the quantity of photons received during a fraction of the consecutive emission-less range, this couple of measurements being called measurement sequence. The measurement time ranges when emitter 10 does not emit are noted Trj, with j=1, 2, 3 . . . . A third timing diagram 73B shows added quantities Q(Txj) of photons measured during each range portion Txj, with x=e or x=r. Quantity Qb(Txj) 74 corresponds to the noise, quantity Qd(Txj) 75 corresponds to the crosstalk, quantity Qa(Txj) 76 corresponds to the ambient light, quantity Qr(Txj) 77 corresponds to the portion of reflected photons, the last three quantities forming the fraction reaching receiver 27 through cavity 23 (and if provided, duct 25).

These timing diagrams, showing several successive emission ranges close in time, are representative of an operating mode of device 21 using a fast emitter 10 and receiver 27, for example, a laser diode and a Geiger-mode detector. Quantities Qb(Txj) 74, Qd(Txj) 75, and Qa(Txj) 76 are substantially constant, at least during a measurement sequence. Thereby, the difference between the quantities of photons measured during two consecutive ranges, the first one with an emission and the second one with no emission, is substantially equal to quantity Qr(Tej) 77.

In the example illustrated in FIG. 7B, during range Te01, no object 14 is sufficiently close to reflect part of the emitted photons. During range Te02, a small quantity of photons is reflected by a distant object 14. Finally, during range Te03, a relatively large quantity of photons is measured, which corresponds to the reflection by a close object 14.

Like for the case corresponding to FIG. 7A, different measurement modes are possible, in particular continuously or during several discontinuous portions.

According to a variation, the duration of one or several emission ranges and the duration of the portions of reception range are parameterizable. For this purpose, the received photon measurement function is used. It is sufficient for the quantity of photons measured during a reception range portion to exceed a given value, determined on design, so that the accuracy of the performed measurement is satisfactory. It is known to determine such a value, either experimentally or by using a series of devices 21 used in various environmental conditions, or by calculation by taking into account the technical specifications of emitter 10 and of receiver 27.

This operation is adapted to the case where a number of emission ranges follow each other within a small time period so that, in particular, the ambient light does not vary by significant proportions. Taking into account to the quantity of photons measured during a period Tej, the duration of the emission and reception ranges of subsequent periods can then be decreased.

This operation enables, among other advantages, to improve the energy balance of the general object detection function, that is, not only of emitter 10 and of receiver 27 but also of electronic circuits used for the associated calculation and processing.

FIGS. 7A and 7B illustrate embodiments further comprising a comparison of the stored value with a threshold and a test on the result of this comparison. An object is to determine whether an object 14 is considered as present. The threshold for example results from an initial measurement performed during a calibration phase on one or several samples of device 21. It is noted Ss 78 in the embodiment shown in FIG. 7A and Sd 80 in the embodiment shown in FIG. 7B.

Threshold Ss 78 is determined so that it is greater than the sum of quantities Qa(Txj), Qb(Txj), and Qd(Txj) (or to an upper bound of this sum to take into account possible measurement tolerances) in the operating range of device 21. When the quantity, formed of the sum of quantities Qa(Txj), Qb(Txj), Qd(Txj), and Qr(Txj), is strictly greater than threshold Ss 78, it is considered that an object 14 is present close to device 21.

Threshold Sd 80 is theoretically equal to 0 and in practice selected to do away with possible uncertainties in the measurement of quantity Qr(Txj). When Qr(Txj) is strictly greater than Sd 80, it is considered that an object 14 is present close to device 21.

In FIG. 7A, the total measured quantity of photons strictly increases along time. In FIG. 7B, the difference measured, cycle after cycle, between the quantity received during the emission and the quantity received during the same sequence when there is no emission has been plotted on time axis 79. In this example, the resulting quantity measuring reflected beam 15 absorbed by the receiver also strictly increases along time.

Figure 8:
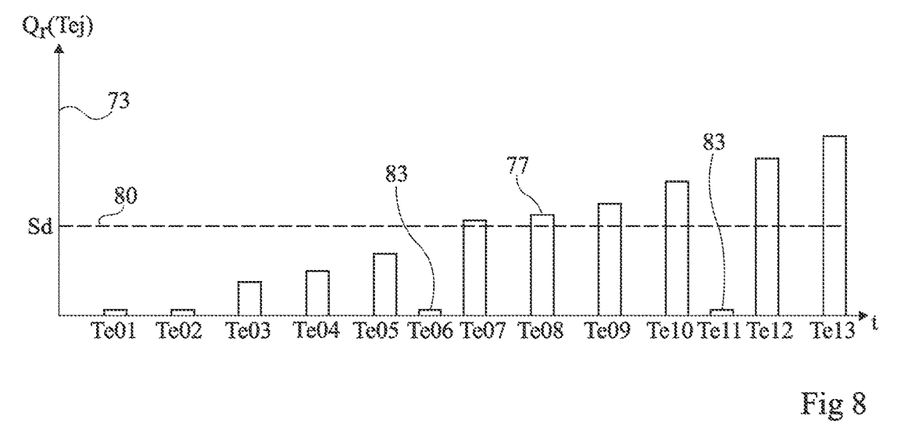
FIG. 8 partially shows a variation of FIG. 7B.

FIG. 8 is a timing diagram illustrating the case of a method determining that the measured value increases in average along time and shows the variation of quantity Qr(Tej). The shown case corresponds to the embodiment of FIG. 7B. An identical line of reasoning applies to the embodiment of FIG. 7A, by substituting the appropriate values to threshold Sd and to measurement Qr(Tej).

During a series of measurement ranges, quantities Qa(Txj), Qb(Txj), and Qd(Txj) are substantially constant. During ranges Te01 and Te02, no object 14 is sufficiently close to reflect part of the emitted photons. During ranges Te03 to Te05, a small quantity of photons is reflected by a distant object 14 without for threshold Sd 80 to be exceeded by Qr(Tej). During ranges Te07 to Te010, Te12 and Te13, a larger quantity of photons, corresponding to the reflection by a close object, results in threshold Sd 80 being exceeded.

A variation of the embodiments illustrated in FIGS. 7A, 7B, and 8 introduces an additional step during which emitter 10 performs at least two emission cycles, preferably a relatively high number of cycles, close in time.

An example is the case of a permanent cyclic emission during the operation of device 21 with a periodicity approximately varying from a few tens of nanoseconds to a few microseconds. The emission is performed over from one to a few tens of periods. A measurement is compared with a previously-stored measurement. If the result is strictly positive, this indicates that photon beam 15 reflected by object 14 located outside of device 21 increases (or that a reflected beam 15 is detected for the first time).

The result provided by this method is all the more accurate as the number of emission cycles is high and as these cycles are close in time. Many techniques which enable to carry out the calculation and storage steps when the number of measurement is sufficiently large, for example, from one to a few tens, can be devised.

For example, to verify the average increase of the measured quantity of photons, while eliminating a limited number of measurements 83 considered as aberrant, a comparison can be performed after each new measurement or after having calculated the average of several measurements.

Further, measurement storage mechanisms and means, for example, comprising storing in the memory the last measured value to replace the previous value once the comparison has been performed, or comprising storing of a number of measurement in different memory positions, which series of measurements has one of the previously-described variations applied thereto, will easily be found. Each of these methods enables to determine whether the measurement increases, in average, a long time, which indicates that an object 14 is present outside of device 21 and comes relatively closer to it.

According to an embodiment, a comparison of the stored values with the threshold and a test on the result of this comparison are further provided. This test, combined with the previous test for verifying the fact that the stored value increases in average over time, eliminates cases where the measured value, although increasing in average, would remain smaller than a threshold such that it cannot be determined whether a reflection on an object effectively occurs. The case where the measured value is in a range corresponding to measurement uncertainties may for example be preferred to be eliminated.

Multiple algorithms for comparing the stored value along emission cycles may be used. A simple example corresponds to the case where the test is declared positive, that is, the object is considered present, as soon as a stored value exceeds the threshold. FIGS. 7A and 7B illustrate this example (increasing function and at least one value above the threshold).

Another example corresponds to the case where the previously-described increase test is validated only if all the stored values having been used for this test are greater than said threshold, possibly after elimination of aberrant values.

FIG. 8 illustrates this other example. In this diagram, from the $7^{th}$ cycle, all values exceed the threshold except for an aberrant measurement 83 at the $11^{th}$ cycle, which is thus not taken into account. Tests "average increase of the stored value" and "stored value at least once greater than the threshold" being both positive, an object 14 is considered to be present.

Different embodiments with different variations have been described hereabove. It should be noted that those skilled in the art may combine various elements of these various embodiments and variations without showing any inventive step. In particular, reference has been made to the detection of the presence of an object, but the point may more generally be to detect a condition relative to this object, for example, a vibration of the object, its light reflection capacity, etc.

Further, the practical implementation of the described embodiments is within the abilities of those skilled in the art based on the functional indications given hereabove and by using tools usual per se.

For example, various methods for storing the measurement of the quantity of received photons are known for the different types of usual photon receivers 27. As an example, sensors having as an output a voltage varying according to the absorbed energy are known. This voltage is converted into a digital or analog value that can be stored in various ways: charge of a capacitor, analog-to-digital conversion and storage in a digital memory element, etc. The use of a processor implementing a series of instructions having digital memory means associated therewith is also possible.

Similarly, the synchronization mechanism carried out within device 21 and enabling to set the measurement period with respect to the emission period is within the abilities of those skilled in the art. The mechanism may use any usual electronic or computer-based principle implemented in similar devices (for example, such as described in patent application U.S. Patent Publication No. 2007/0182949).

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A device comprising:
   a body having a cavity, at least a portion of the body being an opaque structure;
   an aperture in the body that places the cavity in fluid communication with an environment external to the body;
   a photon emitter located in the cavity below the aperture and configured to emit photons through the aperture to the environment external to the body; and
   a photon receiver located in the cavity, the opaque structure of the body being located over, fully covering, and facing an active surface of the photon receiver, the photon receiver being configured to receive, through the same aperture, photons that are both reflected from an object that is spaced apart from the body in the environment external to the body and reflected from a surface of the opaque structure.

2. The device of claim 1, further comprising a semiconductor substrate, wherein the photon emitter and the photon receiver are coupled to the semiconductor substrate.

3. The device of claim 1, wherein the photon receiver receives photons reflected from a plurality of surfaces inside of the body.

4. The device of claim 1, further comprising a display screen.

5. The device of claim 1, wherein the device is a mobile device.

6. The device of claim 1, wherein the photon receiver is coupled to a first surface of the body and wherein the surface of the opaque structure is opposite the first surface of the body.

7. The device of claim 1, wherein the photon receiver is a first photon receiver, the device further comprising a second photon receiver that is configured to receive ambient light.

8. The device of claim 7, wherein at least one measurement performed by the second photon receiver is used to adjust an operating mode of the first photon receiver.

9. The device of claim 1, wherein the opaque structure is a portion of the body.

10. A method comprising:
    emitting photons through an aperture in a body for a period of time;
    receiving the emitted photons reflected from both an object external to and spaced apart from the body and at least two surfaces in a cavity of the body by a photon receiver, the at least two surfaces being a portion of the body, wherein one surface of the at least two surfaces is an opaque structure that is located over and covers the photon receiver such that the emitted photons reflect from the opaque structure before being received by the photon receiver;
    measuring a first value of the emitted photons received by the photon receiver; and
    storing the first value.

11. The method of claim 10, further comprising measuring a second value of the photons received by the photon receiver during a second period of time, wherein the photon emitter does not emit photons during the second period of time, determining a difference between the first value and the second value.

12. The method of claim 10, comprising determining whether the object is proximate the body.

13. The method of claim 10, further comprising:
    adapting a duration of at least one of the following according to the quantity of photons previously received by the photon receiver during at least a portion of a time range of emission by the photon emitter:
    a third period of time of emission by the photon emitter, receiving by the photon receiver during a portion of the time range of emission by the photon emitter, and receiving by the photon receiver during a time range with no emission by the photon emitter.

14. The method of claim 10, further comprising comparing the first value with a threshold, and when the first value is greater than the threshold indicating that an object is external to the device.

15. The method of claim 10, wherein emitting photons comprises emitting photons cyclically, and determining that an object is external to the device when the first value increases over time.

16. The method of claim 15, further comprising comparing the first value with a threshold and when the first value is greater than the threshold, indicating that an object is external to the device.

17. A device comprising:
    a body that includes an open cavity;
    an opaque structure covering a portion of the open cavity;
    an aperture in the opaque structure that places the open cavity in fluid communication with an environment external to the body;
    a radiation emitter located in the open cavity below and aligned with the aperture and configured to emit radiation through the aperture to the environment external to the body; and
    a radiation receiver located in the portion of the open cavity covered by the opaque structure such that the radiation receiver is fully covered by the opaque structure, the radiation receiver being spaced apart from the radiation emitter and configured to receive radiation reflected from an object that is located in the environment external to the body and is spaced apart from and proximate to the body.

18. The device of claim 17, wherein the radiation received by the radiation receiver is further reflected from first and second surfaces in the cavity before being received by the radiation receiver.

19. The device of claim 18, further comprising a substrate located in the cavity, the radiation emitter and the radiation receiver being coupled to a surface of the substrate.

20. The device of claim 19, further comprising filler on the surface of the substrate between the radiation emitter and the radiation receiver, a surface of the filler being the second surface.

21. The device of claim 17 wherein the opaque structure is a portion of the body.

22. A device comprising:
a body that includes a cavity;
a substrate and an opaque structure located over the cavity;
an aperture in the opaque structure that places the cavity in fluid communication with an environment external to the body;
a radiation emitter coupled to a surface of the substrate and located in the cavity below and directly aligned with the aperture and configured to emit radiation through the aperture to the environment external to the body; and
a radiation receiver coupled to the surface of the substrate and located in the cavity below the opaque structure of the body, spaced apart from the radiation emitter, and offset from the aperture, the radiation receiver configured to receive radiation reflected from an object located in the environment external to the body, and that is spaced apart from and proximate to the body, wherein the radiation received by the radiation receiver is further reflected from first and second surfaces in the cavity before being received by the radiation receiver, wherein the first surface in the cavity is a surface of the opaque structure of the body and the second surface is a surface of the substrate.

23. The device of claim 22 wherein the opaque structure is a portion of the body.

\* \* \* \* \*